(12) United States Patent
Yae (10) Patent No.: US 11,877,252 B2
(45) Date of Patent: Jan. 16, 2024

(54) VEHICLE CONTROL SYSTEM AND VEHICLE CONTROL METHOD

(71) Applicants: Hyundai Motor Company, Seoul (KR); Kia Corporation, Seoul (KR)

(72) Inventor: Seong Soo Yae, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/953,872

(22) Filed: Sep. 27, 2022

(65) Prior Publication Data

US 2023/0370990 A1 Nov. 16, 2023

(30) Foreign Application Priority Data

May 12, 2022 (KR) .................. 10-2022-0058453

(51) Int. Cl.
*G06F 15/16* (2006.01)
*H04W 56/00* (2009.01)
*G06F 3/16* (2006.01)
*G06F 3/14* (2006.01)

(52) U.S. Cl.
CPC .......... *H04W 56/0045* (2013.01); *G06F 3/14* (2013.01); *G06F 3/16* (2013.01)

(58) Field of Classification Search
CPC ......... G06F 3/14; G06F 3/16; H04W 56/0045
See application file for complete search history.

(56) References Cited

U.S. PATENT DOCUMENTS

| | | | |
|---|---|---|---|
| 2006/0072627 A1* | 4/2006 | Kugumiya | G11B 27/10 375/E7.278 |
| 2007/0038999 A1* | 2/2007 | Millington | G06F 16/60 718/100 |
| 2012/0082424 A1* | 4/2012 | Hubner | H04N 21/242 386/E5.032 |
| 2013/0251329 A1* | 9/2013 | McCoy | H04N 21/44004 386/E5.032 |
| 2015/0120953 A1* | 4/2015 | Crowe | H04N 21/6547 709/231 |
| 2015/0318977 A1* | 11/2015 | Gelter | H04L 7/0012 709/231 |
| 2017/0019525 A1* | 1/2017 | Hannon | G01S 1/752 |
| 2017/0064651 A1* | 3/2017 | Volkov | H04L 47/30 |
| 2017/0289609 A1* | 10/2017 | Liu | H04N 21/4394 |
| 2018/0329669 A1* | 11/2018 | Becker | H04N 21/8547 |
| 2019/0045304 A1* | 2/2019 | Bhalla | H04R 3/12 |
| 2019/0137990 A1* | 5/2019 | Golgiri | B60W 30/06 |
| 2022/0386260 A1* | 12/2022 | Lee | H04J 3/0664 |

* cited by examiner

*Primary Examiner* — Oleg Survillo
(74) *Attorney, Agent, or Firm* — Fox Rothschild LLP (57) ABSTRACT

A vehicle control system comprises one or more mobile devices that perform wireless communication, and a vehicle control device that sets a maximum value of processing delay times obtained from the one or more mobile devices to a reference time, calculates a first time point at which an image is to be output, a second time point at which sound is to be output, a third time point at which sound is to be transmitted to the one or more mobile devices based on the reference time, and performs control to output the image at the first time point, output the sound at the second time point, and transmit the sound at the third time point.

20 Claims, 8 Drawing Sheets

VEHICLE CONTROL SYSTEM AND VEHICLE CONTROL METHOD

CROSS-REFERENCE TO RELATED APPLICATION(S)

This application claims, under 35 U.S.C. § 119(a), the benefit of Korean Patent Application No. 10-2022-0058453, filed in the Korean Intellectual Property Office on May 12, 2022, the disclosure of which incorporated herein by reference in its entirety.

BACKGROUND

Technical Field

Embodiments of the present disclosure relate to a vehicle control system and a vehicle control method.

Description of the Related Art

A vehicle may provide content (e.g., images or music) desired by a user in various ways such as, for example, through a plurality of mobile devices connected to the vehicle as vehicle infotainment technology has recently been developed.

Depending on the specifications of the mobile device, a unique processing delay time may occur, which causes the same content to be output at different points in time, resulting in a problem in that the user has a sense of rejection because he or she hears sound output from mobile devices at different points in time or sound unsynchronized with the image. Accordingly, a technology for providing sound at the same time to a plurality of mobile devices connected within a vehicle is required.

SUMMARY

The present disclosure has been made to solve the above-mentioned problems occurring in the prior art while advantages achieved by the prior art are maintained intact.

An aspect of the present disclosure provides a vehicle control system and method capable of allowing sound to be output to a plurality of mobile devices connected to a vehicle at the same time point.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control system may comprise one or more mobile devices that perform wireless communication, and a vehicle control device that sets a maximum value of processing delay times obtained from the one or more mobile devices to a reference time, calculates a first time point at which an image is to be output, a second time point at which sound is to be output, a third time point at which sound is to be transmitted to the one or more mobile devices based on the reference time, and performs control to output the image at the first time point, output the sound at the second time point, and transmit the sound at the third time point.

The vehicle control device may be configured to calculate a time point at which the reference time is to elapse from a time point of output processing as the first time point.

The vehicle control device may be configured to calculate a time point at which the reference time is to elapse from a time point of output processing as the second time point.

The vehicle control device may be configured to calculate the third time point for each of the one or more mobile devices based on the processing delay times obtained from the one or more mobile devices.

The vehicle control device may be configured to calculate a time point at which a difference between the reference time and the processing delay times obtained from the one or more mobile devices is to elapse as a third time point.

The vehicle control device may be configured to obtain a processing delay time from a new mobile device when the new mobile device is connected during output processing.

The vehicle control device may be configured to perform control to suspend the output processing when the processing delay time of the new mobile device is longer than the reference time.

The vehicle control device may be configured to change the reference time to be the processing delay time of the new mobile device when the output processing is suspended and recalculate the first time point, the second time point, and the third time point.

The vehicle control device may be configured to perform control to output the image at the recalculated first time point, output the sound at the recalculated second time point, and transmit the sound at the recalculated third time point.

The vehicle control device may comprise an image output device that outputs the image, a sound output device that outputs the sound, and a communication device that transmits the sound to the one or more mobile device.

According to an aspect of the present disclosure, a vehicle control method may comprise receiving, by a vehicle control device, processing delay times from one or more mobile devices, setting, by the vehicle control device, a maximum value of processing delay times obtained from the one or more mobile devices to a reference time, calculating, by the vehicle control device, a first time point at which an image is to be output, a second time point at which sound is to be output, a third time point at which sound is to be transmitted to the one or more mobile devices based on the reference time, and performing, by the vehicle control device, control to output the image at the first time point, output the sound at the second time point, and transmit the sound at the third time point.

The vehicle control method may further comprise calculating a time point at which the reference time is to elapse from a time point of output processing as the first time point.

The vehicle control method may further comprise calculating a time point at which the reference time is to elapse from a time point of output processing as the second time point.

The vehicle control method may further comprise calculating the third time point for each of the one or more mobile devices based on the processing delay times obtained from the one or more mobile devices.

The vehicle control method may further comprise calculating a time point at which a difference between the reference time and the processing delay times obtained from the one or more mobile devices is to elapse as a third time point.

The vehicle control method may further comprise receiving a processing delay time from a new mobile device when the new mobile device is connected during output processing.

The vehicle control method may further comprise performing control to suspend the output processing when the processing delay time of the new mobile device is longer than the reference time.

The vehicle control method may further comprise changing the reference time to be the processing delay time of the new mobile device when the output processing is suspended and recalculate the first time point, the second time point, and the third time point.

The vehicle control method may further comprise performing control to output the image at the recalculated first time point, output the sound at the recalculated second time point, and transmit the sound at the recalculated third time point.

The vehicle control device may comprise an image output device that outputs the image, a sound output device that outputs the sound, and a communication device that transmits the sound to the one or more mobile device.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
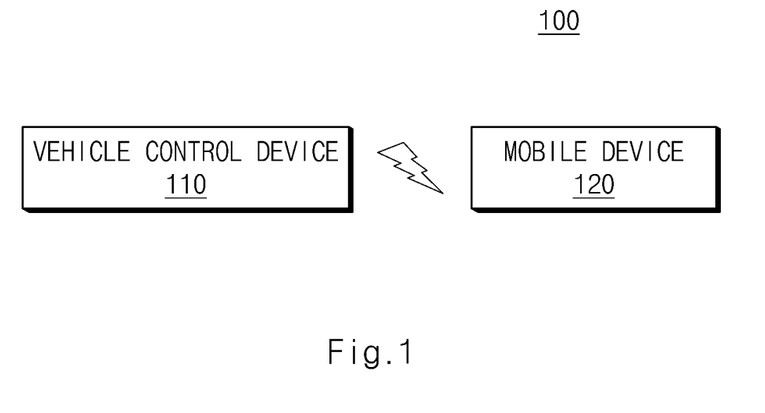
FIG. 1 is a diagram illustrating a configuration of a vehicle control system according to an exemplary embodiment of the present disclosure.

FIG. 1 is a diagram illustrating a configuration of a vehicle control system according to an exemplary embodiment of the present disclosure.

Referring to FIG. 1, a vehicle control system 100 according to an exemplary embodiment of the present disclosure may comprise a vehicle control device 110 and a mobile device 120.

The vehicle control device 110 may be provided in the vehicle, may be configured to output any one or more of image and sound in the vehicle, and when connected to the mobile device 120, may be configured to transmit sound to the mobile device 120.

The mobile device 120 may be connected to the vehicle control device 110 in a wireless or wired manner, and according to an exemplary embodiment of the present disclosure, may comprise a wireless speaker having a sound output device, a wireless headset, a wireless earphone, and the like.

Figure 2:
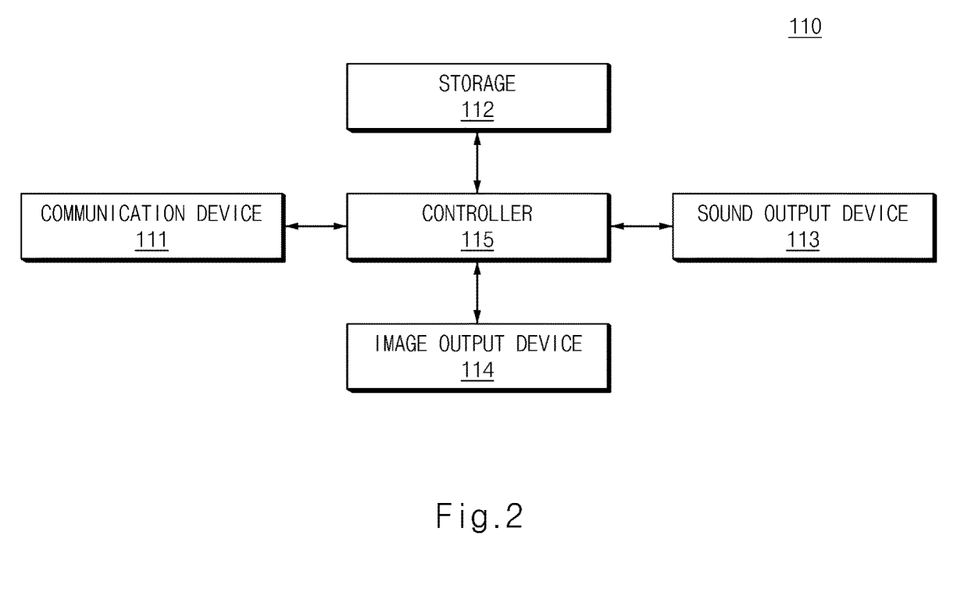
FIG. 2 is a diagram illustrating a configuration of a vehicle control device according to an exemplary embodiment of the present disclosure.

FIG. 2 is a diagram illustrating a configuration of a vehicle control device according to an exemplary embodiment of the present disclosure;

Referring to FIG. 2, the vehicle control device 110 according to an exemplary embodiment of the present disclosure may comprise a communication device 111, storage 112, a sound output device 113, an image output device 114, and a controller 115.

The communication device 111 may be configured to wirelessly communicate with the mobile device 120. The communication device 111 may be configured to communicate with the mobile device 120 through a Bluetooth method.

The storage 112 may be configured to store at least one or more algorithms for performing operations or execution of various commands for the operation of the vehicle control device according to an exemplary embodiment of the present disclosure. The storage 112 may comprise at least one medium of a flash memory, a hard disk, a memory card, a Read-Only Memory (ROM), a Random Access Memory (RAM), an Electrically Erasable Programmable Read-Only Memory (EEPROM), a Programmable Read-Only Memory (PROM), a magnetic memory, a magnetic disk, and an optical disk.

The sound output device 113 may be configured to output sound under the control of the controller 115. According to an exemplary embodiment, the sound output device 113 may comprise a speaker capable of outputting sound. The sound output device 113 may be built in a vehicle and may be provided in a driver's seat, a passenger's seat, or each rear seat. Because the sound output device 113 is connected to the controller 115 in a wired manner, it is possible to output sound without a processing delay time.

The image output device 114 may be configured to output an image (a moving image) under the control of the controller 115. According to an exemplary embodiment, the image output device 114 may comprise a display capable of outputting an image. The image output device 114 may be built in the vehicle, and may be provided in each rear seat. Because the image output device 114 is connected to the controller 115 in a wired manner, it is possible to output an image without a processing delay time.

The controller 115 may be implemented by various processing devices such as a microprocessor incorporating a semiconductor chip capable of operating or executing various instructions or the like and may be configured to control an operation of the vehicle control device according to an exemplary embodiment of the present disclosure.

When connection with one or more mobile devices 120 is established in a wireless or wired manner, the controller 115 may be configured to obtain a processing delay time from the mobile device 120. Here, the processing delay time may mean a time (latency) required for the mobile device to process (complete processing) a command (image output or audio output) of the controller 115. The processing delay time may have a different value according to the specification of the mobile device 120.

The controller 115 may be configured to set a maximum value Dmax among the processing delay times obtained from the one or more mobile devices 120 as a reference time. In addition, the controller 115 may be configured to calculate, based on the reference time, a first time point at which an image is to be output through the image output device 114, a second time point at which sound is to be output through the sound output device 113, and a third time point at which sound is to be transmitted to one or more mobile devices.

According to an exemplary embodiment, the controller 115 may be configured to calculate a time point at which the reference time Dmax is to elapse from an output processing time point as the first time point. For example, when the reference time is 500 ms, a time point at which an image is to be output through the image output device 114 (first time point) may be a time point at which 500 ms is to elapse from the output processing time point. Here, the output processing time point is preferably understood as an output command time point.

Also, the controller 115 may be configured to calculate a time point at which the reference time Dmax is to elapse from the output processing time point as a second time point. For example, when the reference time is 500 ms, a time point at which sound is to be output through the sound output device 113 (second time point) may be a time point at which 500 ms is to elapse from the output processing time point.

Also, the controller 115 may be configured to calculate the third time point for each mobile device based on each processing delay time obtained from each of the one or more mobile devices. According to an exemplary embodiment, the controller 115 may be configured to calculate a time point at which a difference between the reference time and a processing delay time obtained from the mobile device is to elapse from the output processing time point as the third time point. A more detailed description related to the third time point will be described with reference to Table 1.

TABLE 1

| Mobile device | Processing delay time | Reference time | Reference time-processing delay time |
|---|---|---|---|
| First mobile device | 200 ms | 500 ms | 300 ms |
| Second mobile device | 500 ms | 500 ms | 0 ms |
| Third mobile device | 400 ms | 500 ms | 100 ms |

For example, the one or more mobile devices may comprise the first to third mobile devices. When the controller 115 determines that the reference time is 500 ms based on delay times obtained from the first to third mobile devices, a time point at which sound is to be transmitted to the first mobile device (third time point) may be a time point after 300 ms is to elapse from the time point of output processing, a time point at which sound is to be transmitted to the second mobile device (third time point) may be a time point immediately after the time point of the output processing (the time point when 0 ms is to elapse from the time point of output processing), and a time point at which sound is to be transmitted to the third mobile device (third time point) may be a time point after 100 ms is to elapse from the time point of output processing. The controller 115 may be configured to store the first time point, the second time point, and the third time point in the storage 112 when the first time point at which sound is to be output through the image output device 114, the second time point at which sound is to be output through the sound output device 113, the third time point at which sound is to be transmitted to the one or more mobile devices 120 are calculated.

The controller 115 may be configured to perform output processing according to whether or not the vehicle control device 110 is connected to the one or more mobile devices 120. According to an exemplary embodiment, when it is determined that vehicle control device 110 is connected to the one or more mobile devices 120, the controller 115 may be configured to perform control to output an image through the image output device 114 at a pre-stored first time point (time point at which a reference time is to elapse from the time point of output processing) in the case of image output processing. In addition, the controller 115 may be configured to perform control to output sound through the sound output device 113 at a pre-stored first time point (time point at which a reference time is to elapse from the time point of output processing) in the case of sound output processing, and to transmit sound to the mobile device 120 at a pre-stored third time point (time point at which a difference between the reference time and the processing delay time is to elapse from the time point of output processing) in the case of sound output processing. A more detailed description will be given with reference to Table 2.

TABLE 2

| Output device | Processing delay time | Reference time | Time point of output |
|---|---|---|---|
| Image output device | 0 ms | 500 ms | Time point after 500 ms (first time point) |
| Sound output device | 0 ms | 500 ms | Time point after 500 ms (second time point) |
| First mobile device | 200 ms | 500 ms | Time point after 300 ms (third time point) |
| Second mobile device | 500 ms | 500 ms | Time point after 0 ms (third time point) |

For example, the controller 115 may be configured to perform control to output an image through the image output device 114 at a time point (first time point) after 500 ms from the time point of output processing, output sound through the sound output device 113 at a time point (second time point) after 500 ms from the time point of output processing, transmit sound to the first mobile device at a time point (third time point) after 300 ms from the time point of output processing, and transmit sound to the second mobile device immediately after the time point of output processing (0 ms after the time point of output processing, the third time point). Because it takes 200 ms until the first mobile device receives and outputs the sound when the controller 115 transmits sound to the first mobile device after 300 ms from the time point of output processing, the first mobile device may be configured to output sound after 500 ms from the time point of output processing. Also, because it takes 200 ms until the second mobile device receives and outputs the sound when the controller 115 transmits sound to the second mobile device at the time point of output processing, the second mobile device may be configured to output sound after 500 ms from the time point of output processing.

Accordingly, the controller 115 may be configured to synchronize the time point at which an image is to be output through the image output device 114, a time point at which sound is to be output through the sound output device 113, and time points at which the first and second mobile devices are to output sound to provide images and sound to a user at the same time point, thereby improving the user satisfaction.

According to an exemplary embodiment, when it is determined that the vehicle control device 110 is not connected to the one or more mobile devices 120, the controller 115 may be configured to perform control to output images through the image output device at a pre-stored first time point (time point at which a reference time is to elapse from the time point of output processing) in the case of image output processing. In addition, in the case of sound output processing, the controller 115 may be configured to output sound through the sound output device 113 at a pre-stored second time point (time point at which the reference time is to elapse from the time point of output processing). A more detailed description will be given with reference to Table 3,

TABLE 3

| Output device | Processing delay time | Reference time | Time point of output |
|---|---|---|---|
| Image output device | 0 ms | 500 ms | Time point after 500 ms first time point) |
| Sound output device | 0 ms | 500 ms | Time point after 500 ms (second time point) |

For example, the controller 115 may be configured to perform control to output an image through the image output device 114 at a time point (first time point) after 500 ms from the time point of output processing, output sound through the sound output device 113 at a time point (second time point) after 500 ms from the time point of output processing. Accordingly, the controller 115 may be configured to synchronize the time point at which an image is to be output through the image output device 114 and the time point at which sound is to be output through the sound output device 113 to provide the image and the sound to the user at the same time point, thus improving user satisfaction. Meanwhile, the controller 115 may be configured to determine whether a new mobile device is connected during output processing.

When the vehicle control device 110 is connected to the new mobile device, the controller 115 may be configured to obtain a processing delay time from the new mobile device. The controller 115 may be configured to compare the processing delay time obtained from the new mobile device with a reference time.

According to an exemplary embodiment, the controller 115 may be configured to determine whether the processing delay time obtained from the new mobile device is greater than the reference time. When it is determined that the processing delay time obtained from the new mobile device is greater than the reference time, the controller 115 may be configured to perform control to suspend the output.

When the output is suspended, the controller 115 may be configured to change the reference time to be the processing delay time obtained from the new mobile device, and recalculate the first, second, and third time points based on the changed reference time.

For example, when the processing delay time obtained from the new mobile device is 600 ms, the reference time may be determined to be 600 ms, and the time point at which the image is to be output through the image output device 114 (the first time point) may be recalculated as a time point at which 600 ms is to elapse from the time point of output processing.

Also, the controller 115 may be configured to recalculate a time point at which sound is to be output through the sound output device 113 (a second time point) as a time point at which 600 ms is to elapse from the time point of output processing.

Also, the controller 115 may be configured to recalculate the third time point as a time point at which a difference between the reference time and the processing delay time obtained from the new mobile device is to elapse from the time point of output processing. A more detailed description related to the third time point will be given with reference to Table 4.

TABLE 4

| Output device | Processing delay time | Reference time | Time point of output |
|---|---|---|---|
| First mobile device | 200 ms | 600 ms | 400 ms |
| Second mobile device | 500 ms | 600 ms | 100 ms |
| Third mobile device | 400 ms | 600 ms | 200 ms |
| New mobile device | 600 ms | 600 ms | 0 ms |

When the first time point, the second time point, and the third time point are calculated, the controller 115 may be configured to perform output processing. In the case of image output processing, the controller 115 may be configured to perform control to output an image through the image output device 114 at a pre-stored first time point (time point at which the reference time is to elapse from the time point of output processing). In addition, in the case of sound output processing, the controller 115 may be configured to perform control to transmit sound to the new mobile device at a pre-stored third time point (time point at which the difference between the reference time and the processing delay time is to elapse from the time point of output processing).

Figure 3:
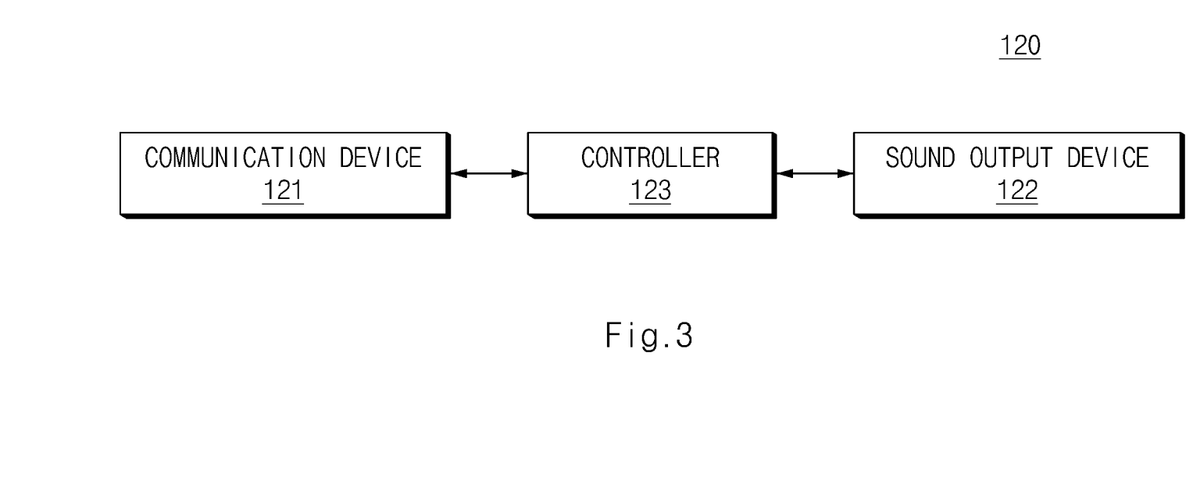
FIG. 3 is a diagram illustrating a configuration of a mobile device according to an exemplary embodiment of the present disclosure.

FIG. 3 is a diagram illustrating a configuration of a mobile device according to an exemplary embodiment of the present disclosure.

Referring to FIG. 3, the mobile device 120 of the present disclosure may comprise a communication device 121, an output device 122, and a controller 123.

The communication device 121 may be configured to wirelessly communicate with the vehicle control device 110. The communication device 121 may be configured to communicate with the vehicle control device 110 in a Bluetooth method.

The output device 122 may be configured to output sound under the control of the controller 123. According to an exemplary embodiment, the output device 122 may comprise a speaker capable of outputting sound.

The controller 123 may be implemented by various processing devices such as a microprocessor incorporating a semiconductor chip capable of operating or executing various instructions or the like and may be configured to control an operation of the mobile device according to an exemplary embodiment of the present disclosure.

When sound is received from the vehicle control device 110, the controller 123 may be configured to perform control to output the sound through the output device 122.

Figure 4:
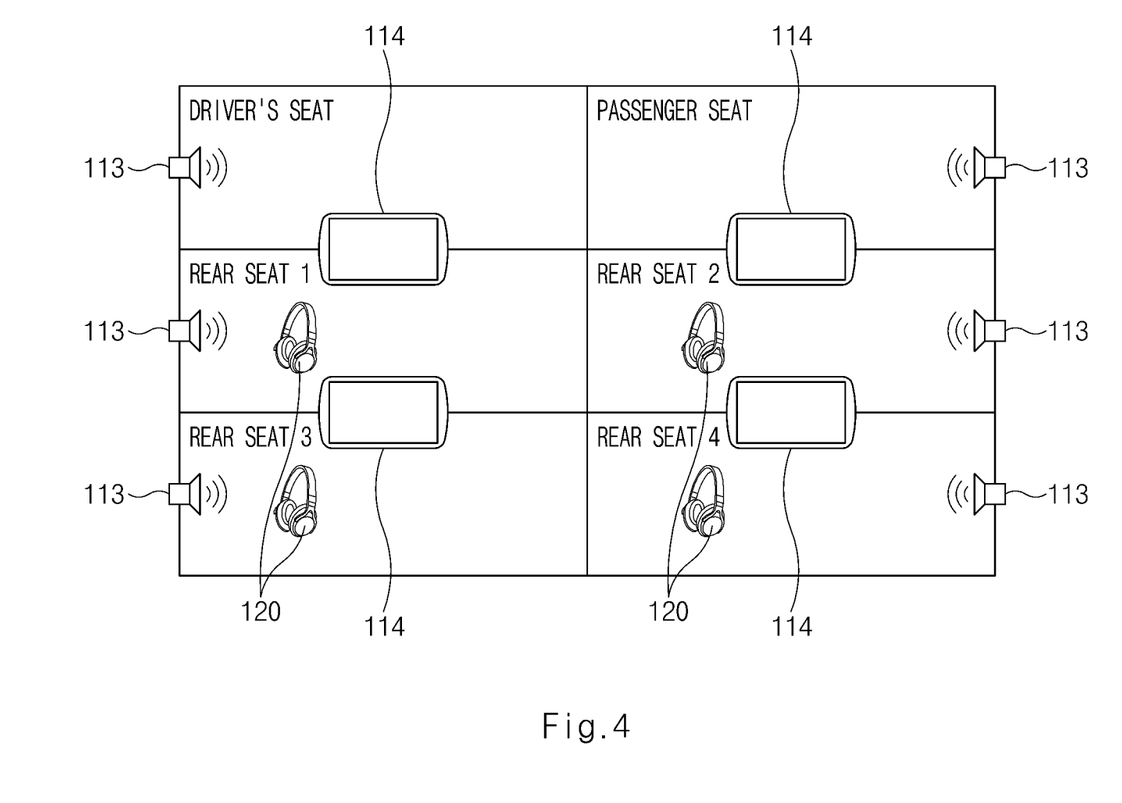
FIG. 4 is a diagram schematically illustrating an image output device, a sound output device, and a mobile device according to an exemplary embodiment of the present disclosure.

FIG. 4 is a diagram schematically illustrating an image output device, a sound output device, and a mobile device according to an exemplary embodiment of the present disclosure.

Referring to FIG. 4, according to an exemplary embodiment of the present disclosure, a plurality of seats may be provided in a vehicle and sound output devices 113 may be respectively provided in the plurality of seats. In addition, the image output device 114 and the mobile device 120 may be provided in each of rear seats (rear seats 1 to 4) of the driver's seat. According to an exemplary embodiment of the present disclosure, the controller 115 may be configured to calculate time points at which images or sound are to be output to the sound output device 113, the image output device 114 and the mobile device 120 according to a processing delay time of each mobile device 120 and perform control to allow the images and sound to be output through the sound output device 113, the image output device 114 and the mobile device 120 at the same time, thus improving user satisfaction.

Figure 5:
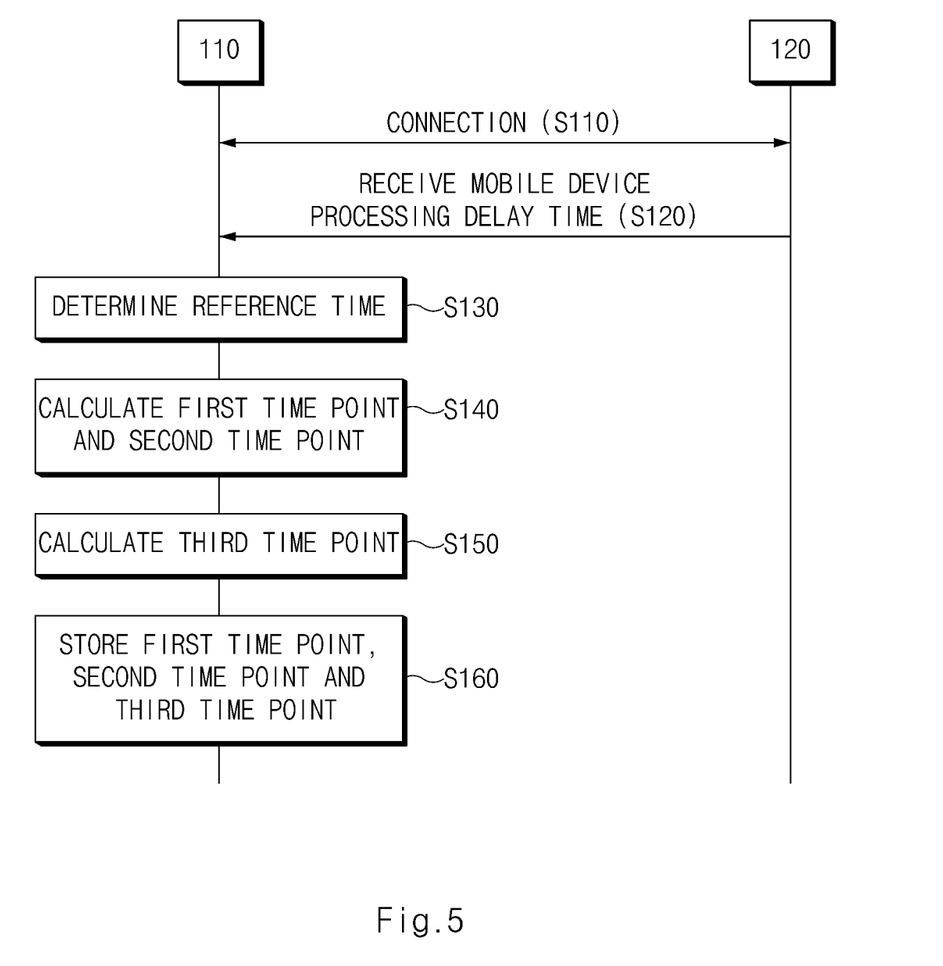
FIGS. 5 to 7 are flowcharts illustrating a vehicle control method according to an exemplary embodiment of the present disclosure.
Figure 6:
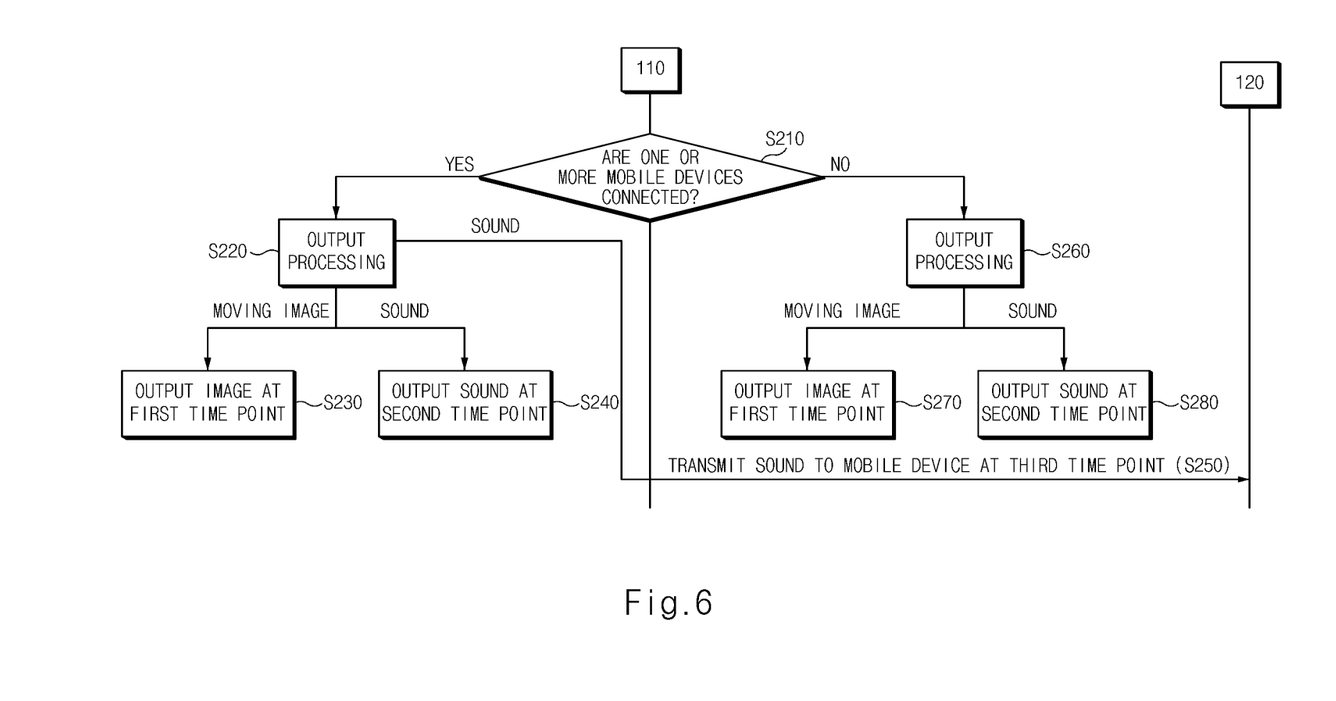
Figure 7:
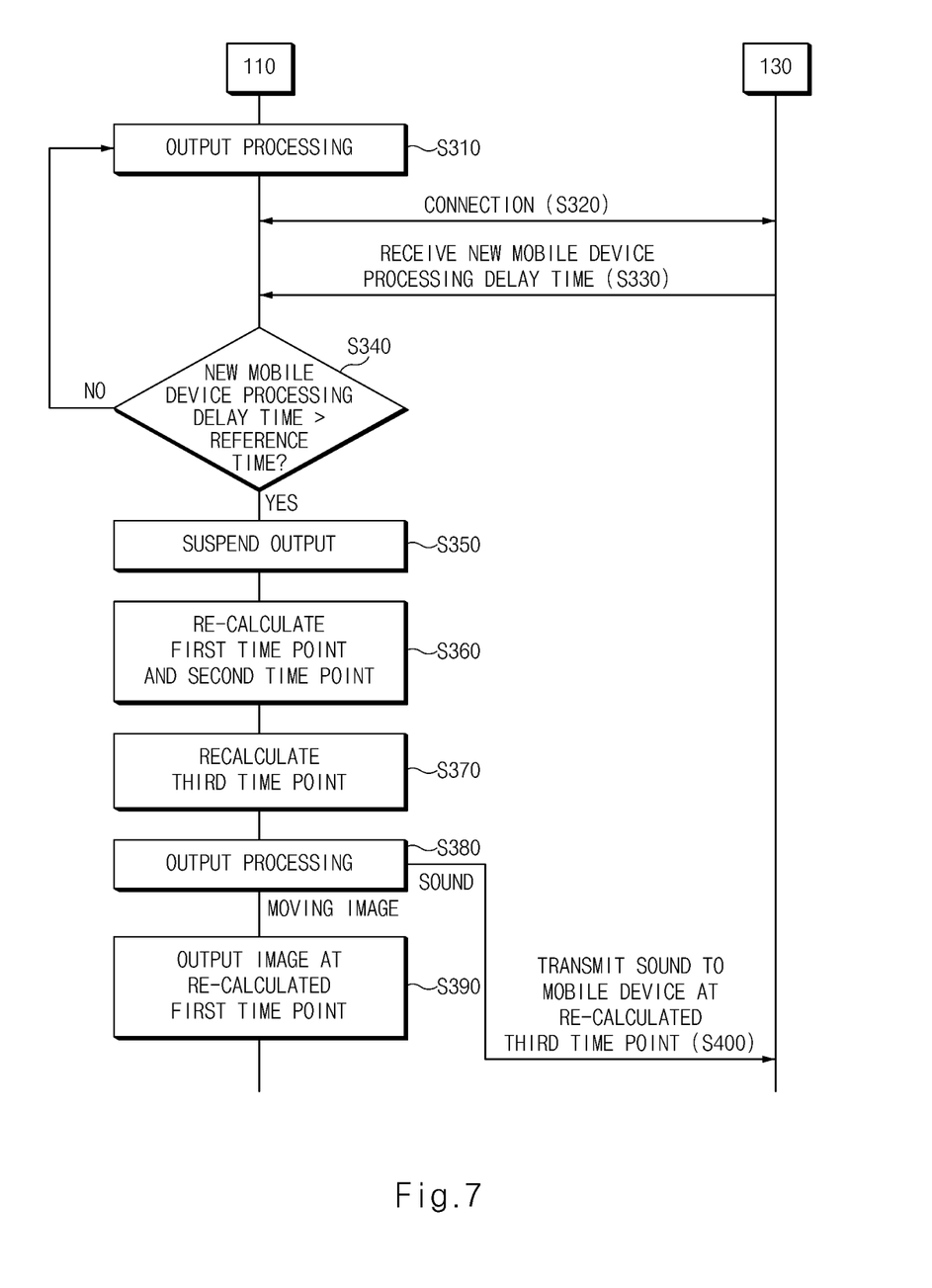

FIGS. 5 to 7 are flowcharts illustrating a vehicle control method according to an exemplary embodiment of the present disclosure.

Referring to FIG. 5, the vehicle control device 110 and the mobile device 120 may be connected in a wireless or wired manner (S110).

The vehicle control device 110 may be configured to receive a processing delay time from the mobile device 120 when the vehicle control device 110 is connected to the mobile device 120 in a wireless or wired manner (S120). Here, the processing delay time may mean a time (latency) required for the mobile device to process a command (completion of processing). The processing delay time may have a different value according to the specification of the mobile device 120.

The vehicle control device 110 may be configured to determine the reference time (S130). In S130, the maximum value Dmax among the processing delay times obtained from the one or more mobile devices 120 may be set as the reference time.

The vehicle control device 110 may be configured to calculate a first time point at which an image is to be output through the image output device 114 and a second time point at which sound is to be output through the sound output device 113 based on the reference time (S140). In S140, the vehicle control device 110 may be configured to calculate a time point at which a reference time is to elapse from the time point of output processing as a first time point and a second time point.

The vehicle control device 110 may be configured to calculate a third time point at which the sound is to be transmitted to one or more mobile devices based on the reference time (S150). In S150, the vehicle control device 110 may be configured to calculate the third time point as a time point at which a difference between the reference time and the processing delay time obtained from the mobile device is to elapse from the time point of output processing.

The vehicle control device 110 may be configured to store the first time point, the second time point, and the third time point in the storage 112 when the first time point at which the image is to be output through the image output device 114, the second time point at which sound is to be output through the sound output device 113, the third time point at which sound is to be transmitted to the one or more mobile devices 120 are calculated (S160).

As shown in FIG. 6, the vehicle control device 110 may be configured to determine whether the vehicle control device 110 is connected to one or more mobile devices 120 (S210).

When it is determined that the vehicle control device 110 is connected to the one or more mobile devices 120 (Yes), the vehicle control device 110 may be configured to perform output processing (S220).

In S220, in the case of image output processing, the vehicle control device 110 may be configured to perform control to output an image through the image output device 114 at a pre-stored first time point (time point at which the reference time is to elapse from the time point of output processing) (S230). In addition, in the case of sound output processing, the vehicle control device 110 may be configured to perform control to output sound through the sound output device 113 at a pre-stored second time point (time point at which the reference time is to elapse from the time point of output processing) (S240). Also, the vehicle control device 110 may be configured to perform control to transmit sound to the mobile device 120 at a pre-stored third time point (time point at which the difference between the reference time and the processing delay time is to elapse from the time point of output processing) (S250).

Meanwhile, when it is determined in S210 that the vehicle control device 110 is not connected to the mobile device 120 (No), the vehicle control device 110 may be configured to perform output processing (S260).

In S260, in the case of image output processing, the controller 115 may be configured to perform control to output an image through the image output device 114 at a pre-stored first time point (time point at which the reference time is to elapse from the time point of output processing) (S270). In addition, in the case of sound output processing, the vehicle control device 110 may be configured to perform control to output sound through the sound output device 113 at a pre-stored second time point (time point at which the reference time is to elapse from the time point of output processing) (S280).

As shown in FIG. 7, the vehicle control device 110 may be configured to perform output processing (S310). S310 may be an operation corresponding to S220 or S260 of FIG. 6.

The vehicle control device 110 may be configured to determine whether the vehicle control device 110 is connected to a new mobile device 130 (S320).

When it is determined that the vehicle control device 110 is connected to the new mobile device 130, the vehicle control device 110 may be configured to receive a processing delay time from the new mobile device (S330).

The vehicle control device 110 may be configured to determine whether the processing delay time received from the new mobile device is greater than a reference time (S340).

When it is determined in S340 that the processing delay time received from the new mobile device is greater than the reference time (Yes), the vehicle control device 110 may be configured to perform control to suspend the output (S350). When it is determined in S340 that the processing delay time received from the new mobile device is not greater than the reference time (No), the vehicle control device 110 may be configured to perform S310.

When the output is suspended, the vehicle control device 110 may be configured to change the reference time to be the processing delay time received from the new mobile device, and recalculate a first time point at which an image is to be output through the image output device 114 and a second time point at which sound is to be output through the sound output device 113 based on the changed reference time (S360). Also, the vehicle control device 110 may be configured to recalculate a time point (third time) at which sound is to be transmitted to the new mobile device 130 based on the changed reference time (S370).

When the first time point, the second time point, and the third time point are recalculated, the vehicle control device 110 may be configured to perform output processing (S380). According to an exemplary embodiment, because it may be determined that the vehicle control device 110 is connected to the one or more mobile devices 130, the vehicle control device 110 may be configured to perform control to output images through the image output device 114 at a pre-stored first time point (time point at which the reference time is to elapse from the time point of output processing) in the case of image output processing. Also, the vehicle control device 110 may be configured to perform control to transmit sound to the new mobile device 130 at a pre-stored third time point (time point at which the difference between the reference time and the processing delay time is to elapse from the time point of output processing) in the case of sound output processing (S400).

Figure 8:
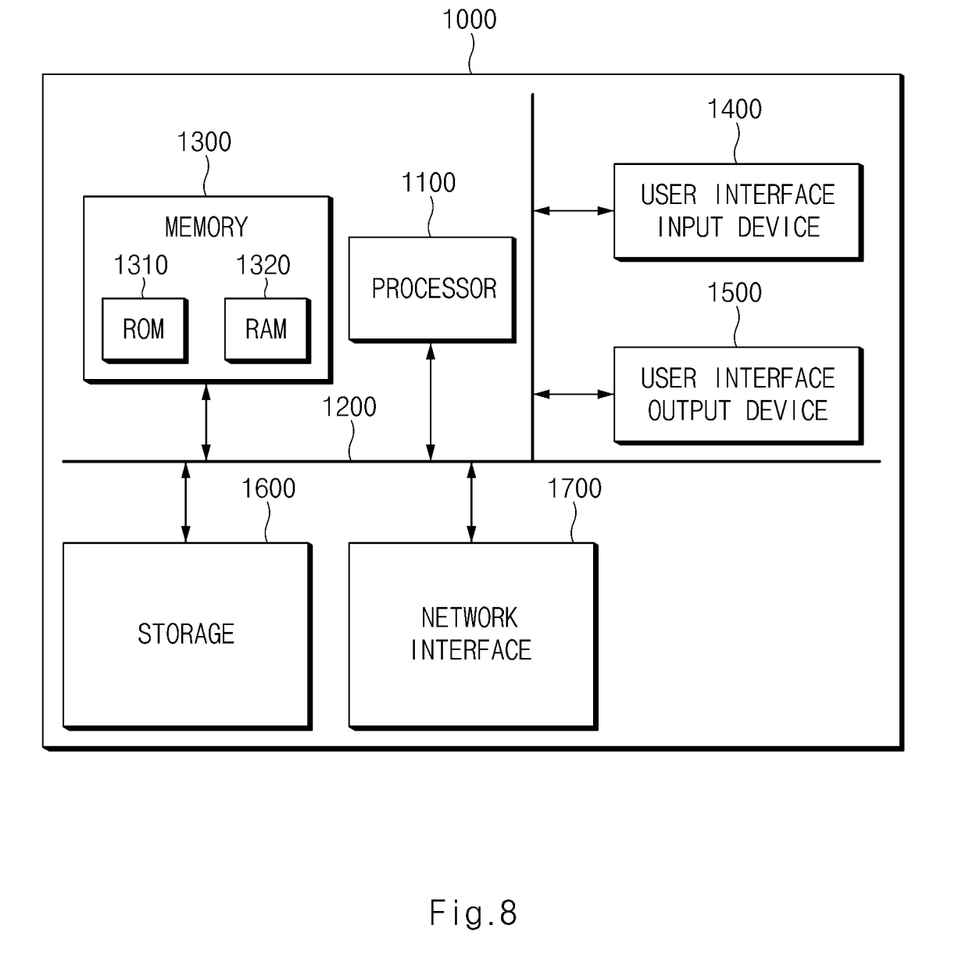
FIG. 8 is a diagram showing a configuration of a computing system for executing a method according to an exemplary embodiment of the present disclosure.

FIG. 8 a diagram showing a configuration of a computing system for executing a method according to an exemplary embodiment of the present disclosure.

Referring to FIG. 8, a computing system 1000 may comprise at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may comprise various types of volatile or non-volatile storage media. For example, the memory 1300 may comprise a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may be configured to read information out of the storage medium and may be configured to record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

According to the vehicle control system and method according to the embodiment of the present disclosure, it is possible to improve user satisfaction by providing sound at the same time point to a plurality of mobile devices connected to a vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle control method comprising:
receiving, by a vehicle control device, processing delay times from one or more mobile devices;
setting, by the vehicle control device, a maximum value of processing delay times obtained from the one or more mobile devices to a reference time;
calculating, by the vehicle control device:
a first time point at which an image is to be output;
a second time point at which sound is to be output; and
a third time point at which sound is to be transmitted to the one or more mobile devices based on the reference time; and
performing, by the vehicle control device, control to output the image at the first time point, output the sound at the second time point, and transmit the sound at the third time point to the one or more mobile devices using the wireless communication with the one or more mobile devices,
wherein the one or more mobile devices output received sound from the vehicle control device, when the one or more mobile devices receive sound transmitted from the vehicle control device at the third time point.

2. The vehicle control method of claim 1, further comprising calculating, as the first time point, a time point at which the reference time is to elapse from a time point of output processing.

3. The vehicle control method of claim 1, further comprising calculating, as the second time point, a time point at which the reference time is to elapse from a time point of output processing.

4. The vehicle control method of claim 1, further comprising calculating the third time point for each of the one or more mobile devices based on the processing delay times obtained from the one or more mobile devices.

5. The vehicle control method of claim 1, further comprising calculating, as the third time point, a time point at which a difference between the reference time and the processing delay times obtained from the one or more mobile devices is to elapse.

6. The vehicle control method of claim 1, further comprising receiving a processing delay time from a new mobile device when the new mobile device is connected during output processing.

7. The vehicle control method of claim 6, further comprising performing control to suspend the output processing when the processing delay time of the new mobile device is longer than the reference time.

8. The vehicle control method of claim 7, further comprising changing the reference time to be the processing delay time of the new mobile device when the output processing is suspended and recalculate the first time point, the second time point, and the third time point.

9. The vehicle control method of claim 8, further comprising performing control to output the image at the recalculated first time point, output the sound at the recalculated second time point, and transmit the sound at the recalculated third time point.

10. The vehicle control method of claim 1, wherein the vehicle control device comprises an image output device configured to output the image, a sound output device configured to output the sound, and a communication device configured to transmit the sound to the one or more mobile devices.

11. A vehicle control system comprising:
one or more mobile devices configured to perform wireless communication; and
a vehicle control device configured to:
set a maximum value of processing delay times obtained from the one or more mobile devices to a reference time;
calculate:
a first time point at which an image is to be output;
a second time point at which sound is to be output; and
a third time point at which sound is to be transmitted to the one or more mobile devices based on the reference time; and
perform control to output the image at the first time point, output the sound at the second time point, and transmit the sound at the third time point to the one or more mobile devices using the wireless communication with the one or more mobile devices,
wherein the one or more mobile devices output received sound from the vehicle control device, when the one or more mobile devices receive sound transmitted from the vehicle control device at the third time point.

12. The vehicle control system of claim 11, wherein the vehicle control device is further configured to calculate the first time point as a time point at which the reference time is to elapse from a time point of output processing.

13. The vehicle control system of claim 11, wherein the vehicle control device is further configured to calculate the second time point as a time point at which the reference time is to elapse from a time point of output processing.

14. The vehicle control system of claim 11, wherein the vehicle control device is further configured to calculate the third time point for each of the one or more mobile devices based on the processing delay times obtained from the one or more mobile devices.

15. The vehicle control system of claim 11, wherein the vehicle control device is further configured to calculate the third time point as a time point at which a difference between the reference time and the processing delay times obtained from the one or more mobile devices is to elapse.

16. The vehicle control system of claim 11, wherein the vehicle control device is further configured to obtain a processing delay time from a new mobile device when the new mobile device is connected during output processing.

17. The vehicle control system of claim 16, wherein the vehicle control device is further configured to perform control to suspend the output processing when the processing delay time of the new mobile device is longer than the reference time.

18. The vehicle control system of claim 17, wherein the vehicle control device is further configured to:
- change the reference time to be the processing delay time of the new mobile device when the output processing is suspended; and
- recalculate the first time point, the second time point, and the third time point.

19. The vehicle control system of claim 18, wherein the vehicle control device is further configured to perform control to:
- output the image at the recalculated first time point;
- output the sound at the recalculated second time point; and
- transmit the sound at the recalculated third time point.

20. The vehicle control system of claim 11, wherein the vehicle control device comprises:
- an image output device configured to output the image;
- a sound output device configured to output the sound; and
- a communication device configured to transmit the sound to the one or more mobile devices.

* * * * *